United States Patent [19]

Suominen

[11] Patent Number: 4,485,482
[45] Date of Patent: Nov. 27, 1984

[54] APPARATUS FOR GENERATING A LASER PULSE

[75] Inventor: Olli Suominen, Espoo, Finland

[73] Assignee: OY Nokia AB, Helsinki, Finland

[21] Appl. No.: 391,831

[22] Filed: Jun. 24, 1982

Related U.S. Application Data

[63] Continuation of Ser. No. 109,987, Jan. 7, 1980, abandoned.

[51] Int. Cl.³ .............................................. H01S 3/091
[52] U.S. Cl. ........................................ 372/70; 372/25
[58] Field of Search .................................. 372/70, 25

[56] References Cited

U.S. PATENT DOCUMENTS 3,584,312  6/1971  Statz ...................................... 372/33

Primary Examiner—William L. Sikes
Assistant Examiner—Léon Scott, Jr.
Attorney, Agent, or Firm—Finnegan, Henderson, Farabow, Garrett & Dunner

[57] ABSTRACT

Apparatus for generating a laser pulse including a device for pumping light energy into a laser material included in a laser oscillator in order to produce a stimulated radiation which tends to increase in the direction of the reflectors in the laser oscillator whereby a part of the energy accumulated in the laser material is discharged as a laser pulse through a partially transmissive reflector by appropriately selecting the dimensions of the laser material and the resonator, the properties of the reflectors and the length and output the light pulse so-called relaxation oscillation hitherto regarded as an interference to make the first relaxation pulse discharge the main portion of the energy accumulated in the laser material as a short laser pulse.

2 Claims, 5 Drawing Figures

APPARATUS FOR GENERATING A LASER PULSE

This is a continuation of application Ser. No. 109,987, filed Jan. 7, 1980, now abandoned.

In a laser material, e.g., in a laser rod one end of which is provided with a fully reflecting mirror and the other end with a partially transmissive mirror, the laser oscillations are developed in the following way. In the beginning, the atoms in the laser rod are on a base level. When the rod is illuminated with a light pulse, said pulse excites the atoms in the rod from the base level to a higher level. A spontaneous radiation produces in some of the atoms a stimulated radiation which tends to increase in the direction of the mirrors because the reflected radiation does not disappear. An avalanche-like photon flow is produced which, at the same time, returns atoms to the base level, and a part of the photons is discharged in the direction of the rod through the partially transmissive mirror.

When employing a so-called Q-coupling, for example, a rotating mirror or prism is used as a 100% reflector whereby a laser pulse is discharged as said mirror or prism is turned to coincide with the direction of the transmissive mirror.

However, a disadvantage of this Q-coupling is the high price of the Q-switch which considerably raises the costs for the laser apparatus.

It is the object of this invention to eliminate the above-mentioned disadvantage and to provide a method for generating a laser pulse wherein no Q-switch is required.

It has now been surprisingly found that by properly selecting the dimensions of the laser material and the resonator, the properties of the mirrors and the length and output of the light pulse, so-called relaxation oscillation generally regarded as an interference in laser technics can be utilized so as to make the first relaxation pulse discharge the main portion of the energy accumulated in the laser material as a short pulse.

More precisely, the apparatus according to the invention is mainly characterized in that the following parameter values are selected for the laser oscillator:

$$t_c < 0.1\, \tau_{sp}{}^1$$

$$\tau_{sp}/(t_c a) > 10^4 \text{ and}$$

$$P_i > \frac{W_T}{t_c} \cdot \frac{1}{100 \ln\left(\frac{\tau_{sp}}{a t_c}\right)}$$

in which inequalities $t_c$ = the average lifetime of a photon in the space between two mirrors $\tau_{sp}$ = the lifetime of spontaneous emission $a = 2 \times \frac{1}{4}\pi \times$ the space angle in which the stimulated emission takes place, $P_i$ = useful energy accumulating in the laser material per unit of time (pumping power), $W_T$ = energy accumulated in the laser material on the so-called threshold level.

However, it should be noted that, when defining the scope of protection, this specification and the accompanying drawings are to be taken into account in their entirety.

By means of the invention substantial advantages are achieved over the prior art. Thus, the laser oscillators according to the invention will be simple and will comprise only a few components. For this reason, they are inexpensive and reliable in operation. Further, they require no special skill in production, testing and service, and neither are any auxiliary circuits needed. In addition, an advantageous coaxial light pumping can be employed in them.

The invention will now be described in more detail with reference to an embodiment showed in the accompanying drawings.

Figure 1:
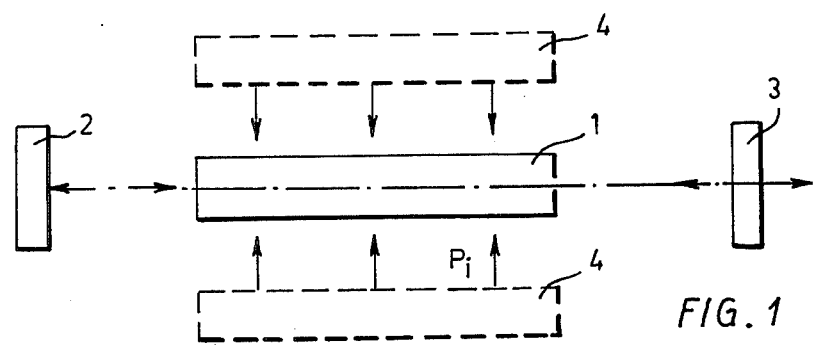
FIG. 1 is a schematic view of a laser oscillator known per se.

According to a structural principle known per se and illustrated in FIG. 1, the laser material 1 is positioned between two parallel mirrors 2 and 3. The mirrors 2 and 3 and the space between them is called a resonator. Usually, one of the mirrors, 2, reflects nearly 100% on the laser wavelength, while the other mirror 3 is partially transmissive whereby a part of the radiation is taken out of the resonator. The laser material 1 is excited by pumping into it energy by means of a pumping means 4. This can be done, for example, by optically illuminating the laser material with a lamp or with a second laser. The energy excited in the laser material first discharges as a spontaneous emission. A part of the spontaneous emission is discharged in the direction of the resonator whereby the mirror 2 or 3 reflects it back into the laser material 1. In the laser material 1, this produces a stimulated emission whereby an amplification takes place. As this amplification increases more energy is accumulated in the laser material. When the amplification in the resonator exceeds what is lost in the losses in the mirrors and the laser material, the signal is amplified in the resonator. When the signal corresponds to the losses, the signal remains constant. When, on the other hand, the losses exceed the amplification, the signal is attenuated.

The basic parameters for the laser material are as follows:

$\lambda$ = the wavelength on which the emission takes place $\tau_{sp}$ = the lifetime of spontaneous emission $A_i$ = the action surface of a charged atom when a stimulated emission is active (when photon reaches the action surface, a stimulated emission takes place)

$\alpha$ = the loss factor of the laser material n = the refractive index of the laser material V = the volume of the laser material l = the length of the laser material In addition, there are defined:

$l_r$ = the optical length of the resonator (nl + free distance between the mirrors 2 and 3 and the laser material 1).

R = the reflection coefficient of the front mirror 3

$t_c = 2\, l_r/c(2\alpha l - \ln R)$ = the average lifetime of a photon in the resonator (i.e. in the space between the mirrors 2 and 3), wherein c = the velocity of light = $2.998 \times 10^8$ m/s $$W_T = \frac{hc}{\lambda} \cdot \frac{V}{A_i} \cdot \left(\alpha - \frac{\ln R}{2l}\right)$$

= energy accumulated in the laser material on the threshold level whereby in the resonator amplification×attenuation=1, wherein h = Planck's constant = $6.626 \times 10^{-34}$ Js
a = $2 \times \frac{1}{4}\pi \times$ (the space angle in which the stimulated emission takes place).
$P_i$ = useful energy accumulating in the laser material per unit of time (=pumping power)
$P_o$ = the output of the laser pulse In the laser oscillator, a laser pulse of a substantially shorter length than the pumping pulse can be generating by selecting appropriate parameters for the oscillator. The result can be considered useful when the following conditions are simultaneously valid:

(I) $t_c < 0.1 \, \tau_{sp}$ (in order that the losses caused by a spontaneous emission shall not be dominant)
(II) $\tau_{sp}/(t_c a) > 10^4$ (so that the laser pulse will be shorter than 30% of the pumping pulse)
(III)

$$P_i > \frac{W_T}{t_c} \cdot \frac{1}{100 \ln\left(\frac{\tau_{sp}}{at_c}\right)}$$

(so that the energy of the laser pulse will be >20% of the energy accumulated in the laser material)

EXAMPLE

Figure 2:
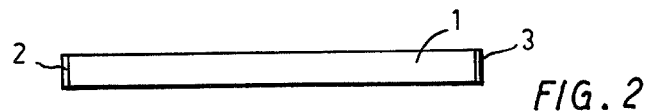
FIG. 2 is a schematic view of a laser oscillator according to the invention.

The length 1 of a ND laser rod according to FIG. 2 is 125 mm and the diameter 4 mm. One end of the rod is provided with an evaporated 99.6% reflector 2 and the other end with a 90% reflector 3. The basic values for this laser oscillator are:
$\lambda = 1.054 \, \mu m$
$\tau_{sp} = 325 \, \mu s$
$A_i = 4.2 \times 10^{-20} \, cm^2$
$\alpha = 0.0001 \, cm^{-1}$
n = 1.55
V = 1.57 $cm^3$
l = 12.5 cm
d = 4 mm
R = 0.9

Figure 3:
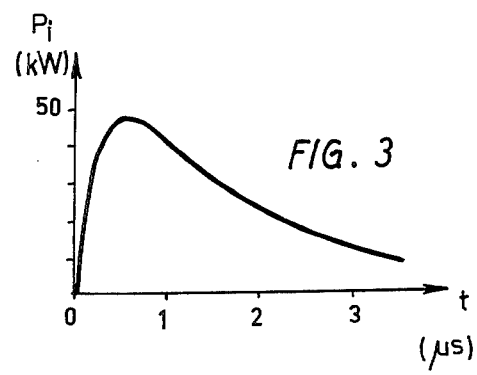
FIG. 3 shows in curve form the useful energy accumulating in the laser material per unit of time as a function of the time (=pumping power).

On the basis of these values, following calculations can be made:
$t_c = 10^{-8}$ s
$W_T = 37$ mJ
$a \approx 2 \times 10^{-7}$ In FIG. 3 there is shown the shape of a light pulse emitted by a coaxial flash bulb (flash tube) which pumps the laser rod. From FIG. 4 again appears the energy stored in the laser rod as a function of the time, and FIG. 5 shows the shape of the output laser pulse.

Figure 4:
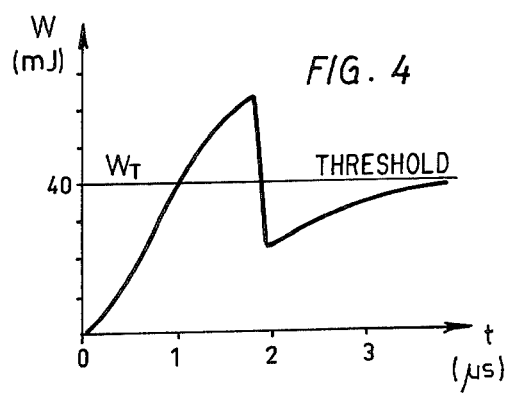
FIG. 4 shows in curve form the energy accumulated in the laser material as a function of the time.
Figure 5:
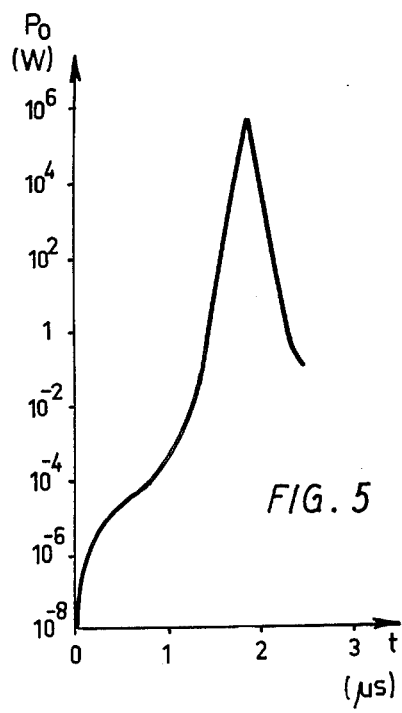
FIG. 5 shows in curve form the output of the laser pulse as a function of the time.

As can be seen from FIGS. 4 and 5, the laser output (power) begins to increase heavily as the energy in the laser rod exceeds the threshold value $W_T = 40$ mJ. Because the signal defined by a spontaneous emission in the direction of the resonator is very small as compared to the pumping power, it must be amplified several decades. This amplification takes time. During this delay, there is time to pump additional energy into the laser rod. The higher one gets above the threshold level, the greater the energy contained in the output laser pulse and the shorter the pulse duration. In this embodiment, the length of the output pulse is about $10^{-7}$s.

On the basis of experiments and calculations it has been possible to establish that the larger $\tau_{sp}/(t_c a)$ is, the better the efficiency obtained and the shorter the laser pulse in relation to the pumping pulse. For example, with the values $$\tau_{sp}/(t_c a) \geq 10^9 \text{ and } \frac{W_T}{t_c} \cdot \frac{1}{3} \geq P_i \geq \frac{W_T}{t_c} \cdot \frac{1}{10 \cdot \ln\left(\frac{\tau_{sp}}{at_c}\right)}$$

a laser pulse is obtained the length whereof is shorter than 10% of the length of the pumping pulse, and the energy of the laser pulse is more than 40% of the energy accumulated in the laser material.

In conclusion, the mirrors can, when employing the apparatus according to the invention, also be arranged according to FIG. 1 spaced from the laser material.

What I claim is:
1. A laser oscillator comprising:
a laser resonator having at one end an approximately 100% reflector and at the other end a partially transmissive reflector;
a laser rod positioned in said resonator, the material of said laser rod being selected and said reflectors being positioned such that

$t_c \leq 0.1 \tau_{sp}$, and $\tau_{sp}/(t_c a) > 10^4$, wherein
$t_c$ equals the average lifetime of a photon in the space between said two reflectors,
a = $2 \times \frac{1}{4}\pi \times$ the space angle in which the stimulated emission takes place, and
$\tau_{sp}$ equals the lifetime of spontaneous emission; and
means for pumping pulses of light energy into said laser rod to produce stimulated radiation which increases in the direction of said reflectors, said means pumping said light energy until the amount of energy accumulated in said laser rod becomes sufficiently large so that a portion of said energy discharges through said partially transmissive reflector as a laser pulse having a substantially shorter length than said pumping pulse, said pumping power, $P_i$, being greater than $W_T/t_c \times 1/(100 \ln(\tau_{sp}/at_c))$, wherein $W_T$ is the energy accumulated in the laser material at the threshold level.

2. The apparatus in claim 1 wherein said material of said laser rod is selected and said reflectors are positioned such that:

$\tau_{sp}/(t_c a) \geq 10^9$; and $W_t/t_c \times \frac{1}{3} \geq P_i \geq W_T/t_c \times 1/(10 \ln(\tau_{sp}/(at_c)))$.

* * * * *